(12) United States Patent
Datko et al.

(10) Patent No.: US 8,173,714 B2
(45) Date of Patent: May 8, 2012

(54) EXPANDED STYRENE POLYMERS HAVING A REDUCED THERMAL CONDUCTIVITY

(75) Inventors: Achim Datko, Leimen (DE); Klaus Hahn, Kirchheim (DE); Markus Allmendinger, Edenkoben (DE)

(73) Assignee: BASF SE, Ludwigshafen (DE)

( * ) Notice: Subject to any disclaimer, the term of this patent is extended or adjusted under 35 U.S.C. 154(b) by 1065 days.

(21) Appl. No.: 11/629,776

(22) PCT Filed: Jun. 9, 2005

(86) PCT No.: PCT/EP2005/006200
§ 371 (c)(1),
(2), (4) Date: Dec. 15, 2006

(87) PCT Pub. No.: WO2005/123816
PCT Pub. Date: Dec. 29, 2005

(65) Prior Publication Data
US 2007/0142488 A1     Jun. 21, 2007

(30) Foreign Application Priority Data
Jun. 16, 2004   (DE) .......................... 10 2004 028 768

(51) Int. Cl.
*C08J 9/00*     (2006.01)

(52) U.S. Cl. ............... 521/60; 521/79; 521/82; 521/98; 521/146

(58) Field of Classification Search .................... 521/60, 521/79, 82, 98, 146
See application file for complete search history.

(56) References Cited

U.S. PATENT DOCUMENTS

| | | | |
|---|---|---|---|
| 6,130,265 A | 10/2000 | Glueck et al. | |
| 6,230,713 B1 | 5/2001 | Dalesandro et al. | |
| 6,340,713 B1 * | 1/2002 | Gluck et al. | 521/60 |
| 6,384,094 B1 * | 5/2002 | Gluck | 521/56 |
| 6,465,533 B1 | 10/2002 | Eberstaller et al. | |

FOREIGN PATENT DOCUMENTS

| | | |
|---|---|---|
| EP | 372343 | 6/1990 |
| EP | 620246 | 10/1994 |
| EP | 981574 | 3/2000 |
| EP | 981575 | 3/2000 |
| WO | WO 97/45477 | 12/1997 |
| WO | WO 98/51735 | 11/1998 |
| WO | WO-00/43442 | 7/2000 |

* cited by examiner

*Primary Examiner* — Irina S Zemel
(74) *Attorney, Agent, or Firm* — Connolly Bove Lodge & Hutz LLP

(57) ABSTRACT

Expanded styrene polymers which have a density of less than 25 g/l and a thermal conductivity λ, determined at 10° C. in accordance with DIN 52612, of less than 32 mW/m*K, and also a process for producing them.

13 Claims, No Drawings

EXPANDED STYRENE POLYMERS HAVING A REDUCED THERMAL CONDUCTIVITY

This application is the National Phase of International Application No. PCT/EP2005/006200 filed on Jun. 9, 2005; and this application claims priority of Application No. 102004028768.6 filed in Germany on Jun. 16, 2004 under 35 U.S.C. § 119; the entire contents of all are hereby incorporated by reference.

DESCRIPTION

The invention relates to expanded styrene polymers which have a density of less than 25 g/l and a thermal conductivity $\lambda$, determined at 10° C. in accordance with DIN 52612, of less than 32 mW/m*K, and also a process for producing them.

Expanded polystyrenes have been known for a long time and have proven useful in many fields. Such foams are produced by foaming of polystyrene particles impregnated with blowing agents and the subsequent welding together of the foam particles produced in this way to give moldings. An important field of use is thermal insulation in building and construction.

The foam boards comprising expanded polystyrene which are used for thermal insulation usually have densities of about 30 g/l, since the thermal conductivity of expanded polystyrene displays a minimum at these densities. To save material, it would be desirable to use foam boards having lower densities, in particular <15 g/l, for thermal insulation. However, such foam boards having a lower density have a drastically poorer thermal conductivity, so that they do not meet the requirements of thermal conductivity class 035 (DIN 18 164, Part 1).

To reduce the thermal conductivity of polystyrene foams, athermanous materials such as carbon black (EP-A 372 343, EP-A 620 246), graphite (EP-A 981 574 and EP-A 981 575) or aluminum platelets (WO 00/043442) have been added to these in various ways. Depending on the type and method of incorporation, large amounts of the athermanous materials are required, and these can, due to their nucleating action, lead to problems in homogeneous incorporation. Furthermore, the mechanical properties of the foams produced therefrom and their burning behavior can be adversely affected.

The thermal conductivity of polystyrene foams is also influenced by the type and amount of the cell gas. For environmental reasons, halogen-containing blowing agents have been replaced by volatile blowing agents comprising hydrocarbons. Since the latter generally diffuse out of the foam within a short time after foaming of the expandable polystyrenes, the thermal conductivity measured immediately after foaming increases slightly again on storage.

It was therefore an object of the present invention to remedy the disadvantages mentioned and to provide expanded styrene polymers having an improved thermal conductivity, good mechanical properties and, in particular, good fire protection properties. Furthermore, a process for preparing expandable styrene polymers containing blowing agent, which can be foamed and sintered to give the expanded styrene polymers having an improved thermal conductivity, is to be provided.

Accordingly, we have found the abovementioned expanded styrene polymers.

The expanded styrene polymers preferably have a thermal conductivity $\lambda$, determined at 10° C. in accordance with DIN 52612, of less than 32 mW/m*K, preferably in the range from 27 to 31 mW/m*K, particularly preferably in the range from 28 to 30 mW/m*K, even at densities in the range from 7 to 20 g/l, preferably in the range from 10 to 16 g/l.

The expanded styrene polymers preferably have from 2 to 15 cells/mm.

In general, the low thermal conductivities are obtained even when the blowing agent has essentially diffused from the cells, i.e. the cells are filled with a gas which comprises at least 90% by volume, preferably from 95 to 99% by volume, of an inorganic gas, in particular air.

The expanded styrene polymers preferably contain an organic bromine compound having a bromine content of at least 70% by weight. It is in this way possible to obtain self-extinguishing expanded styrene polymers which pass the burning test B2 in accordance with DIN 4102.

The expanded styrene polymers of the invention can be obtained by prefoaming and sintering the corresponding expandable styrene polymers.

For the purposes of the present invention, expandable styrene polymers are styrene polymers containing blowing agent.

The expandable styrene polymers of the invention comprise as polymer matrix in particular homopolystyrene or styrene copolymers with up to 20% by weight, based on the weight of the polymers, of ethylenically unsaturated comonomers, in particular alkylstyrenes, divinylbenzene, acrylonitrile or a-methylstyrene. Blends of polystyrene and other polymers, in particular those comprising rubber and polyphenylene ether, are also possible.

The styrene polymers can further comprise the customary and known auxiliaries and additives, for example flame retardants, nucleating agents, UV stabilizers, chain transfer agents, blowing agents, plasticizers, pigments and antioxidants.

The expandable particles are coated with the customary and known coating materials, for example metal stearates, glyceryl esters and finely divided silicates.

The particle size of the expandable styrene polymers is preferably in the range of 0.2-2 mm.

The amount of athermanous particles used depends on their type and action. The expanded styrene polymers preferably contain from 0.5 to 5% by weight, particularly preferably from 1 to 4% by weight, of athermanous particles. Preferred athermanous particles are graphite, carbon black or aluminum having a mean particle size in the range from 1 to 50 µm.

The preferred graphite preferably has a mean particle size of from 1 to 50 µm, in particular from 2.5 to 12 µm, a bulk density of from 100 to 500 g/l and a specific surface area of from 5 to 20 $m^2/g$. It is possible to use natural graphite or milled synthetic graphite. The graphite particles are preferably present in the styrene polymer in amounts of from 0.05 to 8% by weight, in particular from 0.1 to 5% by weight.

One problem associated with the use of graphite particles is the ready combustibility of the expanded polystyrenes containing graphite particles. To pass the burning tests necessary for use in building and construction (B1 and B2 in accordance with DIN 4102), flame retardants, in particular ones based on organic bromine compounds having a bromine content of at least 70% by weight, are, in a preferred embodiment of the invention, added to the expandable styrene polymers. The bromine compound should be added in an amount (without synergist) of more than 3% by weight, based on the weight of the expandable styrene polymers.

This amount of flame retardants surprisingly leads to no adverse effect on the mechanical properties of the expanded polystyrenes containing carbon black.

Aliphatic, cycloaliphatic and aromatic bromine compounds such as hexabromocyclododecane, pentabromomonochlorocyclohexane, pentabromophenyl allyl ether, are particularly useful.

The action of the bromine-containing flame retardants is considerably improved by addition of C-C-labile or O-O labile organic compounds. Examples of suitable flame retardant synergists are dicumyl and dicumyl peroxide. A preferred combination comprises from 0.6 to 5% by weight of organic bromine compound and from 0.1 to 1.0% by weight of the C-C labile or O-O labile organic compound.

The expandable styrene polymers of the invention can be prepared by various methods.

In one embodiment, the athermanous particles and a nonionic surfactant are mixed with a melt of the styrene polymer, preferably in an extruder. In this case, the blowing agent is simultaneously added to the melt. The athermanous particles can also be incorporated into a melt of styrene polymer containing blowing agent, advantageously using sieved-out oversize and undersize fractions of polystyrene beads containing blowing agent which have been formed in a suspension polymerization. The polystyrene melt containing blowing agent and athermanous particles is extruded and chopped to give pellets containing blowing agent. Since the athermanous particles can have a strong nucleating action, the melt should be cooled quickly under pressure after extrusion in order to avoid foaming. Underwater pelletization under pressure in a closed system is therefore advantageously carried out.

It is also possible to add the blowing agent to the styrene polymers containing athermanous particles in a separate process step. In this case, the pellets are preferably impregnated in aqueous suspension with the blowing agent.

In all three cases, the finely divided athermanous particles and the nonionic surfactant can be added directly to a polystyrene melt. However, the athermanous particles can also be added to the melt in the form of a concentrate in polystyrene. Preference is, however, given to introducing polystyrene pellets and athermanous particles together into an extruder, melting the polystyrene and mixing it with the athermanous particles.

It is in principle also possible to incorporate the athermanous particles and a nonionic surfactant in the suspension polymerization, as long as they are sufficiently inert to the water which is generally used as suspension medium. They can in this case be added to the monomeric styrene before it is suspended or be added to the reaction mixture during the polymerization, preferably during the first half of the polymerization cycle. The blowing agent is preferably added during the polymerization, but can also be incorporated afterwards into the styrene polymer. It has been found that the presence of a solution of polystyrene (or an appropriate styrene copolymer) in styrene (or the mixture of styrene with comonomers) at the beginning of the suspension polymerization improves the stability of the suspension. The process preferably starts out from a 0.5-30% strength by weight, in particular 5-20% strength by weight, solution of polystyrene in styrene. This can be achieved by dissolution of fresh polystyrene in monomers, but it is advantageous to use oversize and undersize fractions which are sieved out in the fractionation of the beads obtained in the preparation of expandable polystyrene. In practice, such otherwise unusable oversize and undersize fractions have diameters of greater than 2.0 mm or less than 0.2 mm. Recycled polystyrene and recycled polystyrene foam can also be used. Another possibility is to prepolymerize styrene in bulk to a conversion of from 0.5 to 70% and to suspend the prepolymer together with the athermanous particles in the aqueous phase and complete the polymerization.

The blowing agent is added in the customary amounts of about 3-10% by weight, based on the weight of the polymer. Blowing agents used are usually aliphatic hydrocarbons having from 3 to 10, preferably from 4 to 6, carbon atoms.

The expandable styrene polymers are particularly preferably prepared by polymerization of styrene and, if appropriate, copolymerizable monomers in aqueous suspension and impregnation with a blowing agent, with the polymerization being carried out in the presence of from 0.1 to 5% by weight of graphite particles, based on the styrene polymer, and a nonionic surfactant.

Suitable nonionic surfactants are, for example, maleic anhydride copolymers (MA), e.g. composed of maleic anhydride and $C_{20\text{-}24}$-1-olefin, polyisobutylene-succinic anhydrides (PIBSA) or the reaction products of these with hydroxypolyethylene glycol esters, diethylaminoethanol or amines such as tridecylamine, octylamine or polyetheramine, tetraethylenepentaamine or mixtures thereof. The molecular weights of the nonionic surfactant are preferably in the range from 500 to 3000 g/mol. They are generally used in amounts in the range from 0.01 to 2% by weight, based on styrene polymer.

The novel expandable styrene polymers containing athermanous particles can be processed to give polystyrene foams having densities of 5-35 g/l, preferably from 810 to 25 g/l and in particular 10-15 g/l.

For this purpose, the expandable particles are prefoamed. This is usually carried out by heating the particles by means of steam in prefoamers.

The particles which have been prefoamed in this way are then welded together to give moldings. For this purpose, the prefoamed particles are introduced into molds which do not close in a gastight fashion and are treated with steam. After cooling, the moldings can be taken out.

The foams produced from the expandable styrene polymers of the invention have excellent thermal insulation properties. This effect is particularly evident at low densities.

The ability to reduce the density of the expanded styrene polymers while the thermal conductivity remains the same makes it possible to achieve materials savings. Since the same thermal insulation effect can be achieved at significantly lower bulk densities compared to conventional expandable styrene polymers, thinner foam boards can be used when the expandable polystyrene particles prepared according to the invention are used, which makes it possible to save space.

The expandable styrene polymers of the invention can surprisingly be processed without any problems to give foams having a low density.

The foams of the invention can be used for thermal insulation of buildings and parts of buildings, for thermal insulation of machines and household appliances and also as packaging materials.

The invention is illustrated by the following examples. The parts and percentages reported are by weight.

EXAMPLES

Starting Materials:
Pulverulent graphite having a mean particle size of 4-5 μm (Grafitwerk Kropfmühl AG, UF 2 98),
nonionic surfactant: equimolar reaction product of maleic anhydride-$C_{20\text{-}24}$ 1-olefin copolymer (MA) with tridecylamine (TDA), anionic surfactant: Emulgator K30 (sodium alkanesulfonate, 1% strength solution in water, Bayer AG)

dicetyl peroxodicarbonate (Perkadox®) 24 from Akzo-Nobel)

Examples 1 and 2:

156.2 g of hexabromocyclododecane (HBCD) and 2.13 kg of expandable polystyrene oversize and undersize fraction (polystyrene) were dissolved in 14.20 kg of styrene and 568 g of pulverulent graphite (4% by weight based on the amount of styrene) were homogeneously suspended therein with addition of 80.9 g of dicumyl peroxide, 14.2 g of tert-butyl peroxy-2-ethylhexanoate, 14.2 g of dicetyl peroxodicarbonate and 14.2 g of nonionic surfactant (MA+TDA). The organic phase was added to 24.68 l of deionized water and 2.945 kg of magnesium sulfate/sodium pyrophosphate precipitate in a pressure-rated 50 l stirred vessel. The reaction mixture was heated while stirring to 95° C. over a period of 1.5 hours. It was subsequently heated to 130° C. over a period of 4.0 hours, with 322.1 g of Emulgator K30 (1% strength) being added 115 minutes after reaching 80° C., 1.06 kg of pentane being added over a period of 30 minutes 190 minutes after reaching 80° C. and 156.2 g of Armostat 2% strength being added 225 minutes after reaching 80° C. The polymerization is finally completed at 130° C. over a period of 2 hours.

The beads obtained were separated off from the aqueous phase, dried by means of warm air and sieved to 1.0-2.0 mm. The beads were prefoamed by means of steam and subsequently welded together to give moldings having densities of from 10 to 20 g/l and stored until the weight was constant. The thermal conductivities (TCs) determined at 10° C. in accordance with DIN 52612 (Poensgen method) are shown in table 1.

Comparative Experiments C1 and C2

Examples 1 and 2 were repeated without addition of anionic surfactant.

TABLE 1

| Example | Density of molding [g/l] | TC [mW/m * K] |
|---------|--------------------------|---------------|
| 1       | 15 ± 1                   | 31            |
| 2       | 19 ± 1                   | 30            |
| C1      | 14 ± 1                   | 33            |
| C2      | 18 ± 1                   | 33            |

The invention claimed is:

1. An expanded styrene polymer having a density in the range from 7 to 20 g/l and a thermal conductivity λ, determined at 10° C. in accordance with DIN 52612, in the range from 27 to 31 mW/m*K, which comprises from 1 to 4% by weight of natural graphite having a mean particle size in the range from 1 to 50 μm, and which has been obtained by pre-foaming, and welding of an expandable styrene polymer, the expandable styrene polymer having been obtained by polymerization of styrene and, optionally, copolymerizable monomers and impregnation with a blowing agent, wherein the polymerization is carried out in the presence of 0.01 to 2% of a nonionic surfactant.

2. The expanded styrene polymer according to claim 1, wherein the expanded styrene polymer has from 2 to 15 cells/mm.

3. The expanded styrene polymer according to claim 1, wherein the cells are tilled with a gas which comprises at least 90% by volume of an inorganic gas.

4. The expanded styrene polymer according to claim 1, which comprises an organic bromine compound having a bromine content of at least 70% by weight and passes the burning test B2 in accordance with DIN 4102.

5. The expanded styrene polymer according to claim 2, wherein the cells are filled with a gas which comprises at least 90% by volume of an inorganic gas.

6. The expanded styrene polymer according to claim 2, which comprises an organic bromine compound having a bromine content of at least 70% by weight and passes the burning test B2 in accordance with DIN 4102.

7. The expanded styrene polymer according to claim 1, wherein the nonionic surfactant is a maleic anhydride copolymer (MA), polyisobutylene anhydride (PIBSA) or a reaction product of one of these with hydroxypolyethylene glycol esters or amines.

8. The expanded styrene polymer according to claim 1, wherein the molecular weight of the nonionic surfactant is in the range from 500 to 3000 g/mol.

9. The expanded styrene polymer according to claim 7, wherein the molecular weight of the nonionic surfactant is in the range from 500 to 3000 g/mol.

10. A process for preparing expanded styrene polymers by polymerization of styrene and. optionally, copolymerizable monomers in aqueous suspension and impregnation with a blowing agent, wherein tile polymerization is carried out in the presence of from 0.1 to 4% by weight of graphite particles having a mean particle size in the range from 1 to 50 μm, based on the styrene polymer, and 0.01 to 2% of a nonionic surfactant, and obtaining an expanded styrene polymer by pre-foaming and welding the expandable styrene polymer, the expanded styrene polymer having a density in the range, from 7 to 20 g/l and a thermal conductivity λ, determined at 10° C. in accordance with DIN 52612, in the range from 27 to 31 mW/m*K.

11. The process according to claim 10, wherein the nonionic surfactant is a maleic anhydride copolymer (MA), polyisobutylene anhydride (PIBSA) or a reaction product of one of these with hydroxypolyethylene glycol esters or amines in amounts in the range from 0.01 to 2% by weight, based on the styrene polymer.

12. The process according to claim 10, wherein the molecular weight of the nonionic surfactant is in the range from 500 to 3000 g/mol.

13. The process according claim 11, wherein the molecular weight of the nonionic surlactant is in the range from 500 to 3000 g/mol.

* * * * *